United States Patent
Fukuchi et al.

(10) Patent No.: US 12,024,762 B2
(45) Date of Patent: Jul. 2, 2024

(54) NON-ORIENTED ELECTRICAL STEEL SHEET

(71) Applicant: NIPPON STEEL CORPORATION, Tokyo (JP)

(72) Inventors: Minako Fukuchi, Tokyo (JP); Yoshiaki Natori, Tokyo (JP); Tesshu Murakawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/279,161

(22) PCT Filed: Mar. 31, 2022

(86) PCT No.: PCT/JP2022/016490
§ 371 (c)(1),
(2) Date: Aug. 28, 2023

(87) PCT Pub. No.: WO2022/211016
PCT Pub. Date: Oct. 6, 2022

(65) Prior Publication Data
US 2024/0035130 A1   Feb. 1, 2024

(30) Foreign Application Priority Data

Apr. 2, 2021   (JP) .................. 2021-063652

(51) Int. Cl.
C22C 38/02    (2006.01)
C21D 9/46    (2006.01)
C22C 38/00    (2006.01)
C22C 38/06    (2006.01)
H01F 1/147    (2006.01)

(52) U.S. Cl.
CPC ............. C22C 38/02 (2013.01); C21D 9/46 (2013.01); C22C 38/004 (2013.01); C22C 38/06 (2013.01); H01F 1/147 (2013.01)

(58) Field of Classification Search
CPC ...................................................... C21D 9/46
See application file for complete search history.

(56) References Cited

U.S. PATENT DOCUMENTS

2020/0350104 A1* 11/2020 Kubota ............... C21D 8/1211
2021/0301363 A1   9/2021 Yashiki et al.
2023/0106818 A1   4/2023 Fukuchi et al.

FOREIGN PATENT DOCUMENTS

| | | | |
|---|---|---|---|
| CN | 112513299 A | 3/2021 | |
| JP | 2006-219692 A | 8/2006 | |
| JP | 4218077 B2 | 2/2009 | |
| JP | 2011-111658 A | 6/2011 | |
| JP | 2011-162821 A | 8/2011 | |
| JP | 5256916 B2 | 8/2013 | |
| JP | 2017-145462 A | 8/2017 | |
| JP | 2017-193731 A | 10/2017 | |
| JP | 2019-178380 A | 10/2019 | |
| JP | 2019-183185 A | 10/2019 | |
| JP | 2020-76138 A | 5/2020 | |
| JP | 2021-80501 A | 5/2021 | |
| WO | WO 2013/080891 A1 | 6/2013 | |
| WO | WO-2019160087 A1 * | 8/2019 | ........... B22D 11/001 |
| WO | WO 2021/205880 A1 | 10/2021 | |

* cited by examiner

*Primary Examiner* — Jophy S. Koshy

(74) *Attorney, Agent, or Firm* — Birch, Stewart, Kolasch & Birch, LLP

(57) ABSTRACT

A non-oriented electrical steel sheet has a chemical composition in which α-γ transformation can occur and which contains at least, in terms of mass %, at most 0.010% of C, 1.50% to 4.00% of Si, 0.0001% to 1.0% of sol. Al, at most 0.010% of S, at most 0.010% of N, and a total of 2.50% to 5.00% of at least one selected from the group consisting of Mn, Ni, and Cu, with the balance including Fe and impurities, wherein when an average grain size of {411} crystal grains is defined as $d_{411}$ and an average grain size of {111} crystal grains is defined as $d_{111}$, $d_{411}/d_{111} \geq 1.10$.

1 Claim, No Drawings

NON-ORIENTED ELECTRICAL STEEL SHEET

TECHNICAL FIELD

The present invention relates to a non-oriented electrical steel sheet.

Priority is claimed on Japanese Patent Application No. 2021-063652, filed Apr. 2, 2021, the content of which is incorporated herein by reference.

BACKGROUND ART

Electrical steel sheets are used as materials for cores (iron cores) of electrical devices. Examples of electrical devices include drive motors mounted on automobiles, motors for various compressors typified by air conditioners and refrigerators, and generators for domestic or industrial use. These electrical devices are required to have high energy efficiency, smaller sizes, and higher outputs. For that reason, low core loss and high magnetic flux density are required for electrical steel sheets used as cores of electrical devices. As a solution therefor, there is texture control, and techniques of developing a texture (α-fibers) that has an axis of easy magnetization in a sheet plane of a steel sheet, is advantageous for improving magnetic characteristics, and of which integration can be relatively easily increased through rolling in hot rolling and cold rolling, which are essential processes in manufacturing of the steel sheet have been proposed so far. Specifically, techniques of developing a texture whose <110> direction is substantially parallel to a rolling direction (RD) have been proposed.

Patent Documents 1 to 3 all disclose methods for developing a {100}<011> orientation and describe lowering a transformation temperature and performing quenching after hot rolling to make a texture finer.

Specifically, Patent Document 1 describes that cooling is performed to at most 250° C. at a cooling rate of at least 200° C./sec within 3 seconds after hot rolling and describes that annealing is not performed between hot rolling and cold rolling and a cumulative rolling reduction in cold rolling is set to at least 88%. Patent Document 1 describes that, by the above method, an electrical steel sheet integrated in a {100}<011> orientation on a sheet surface of the steel sheet can be manufactured.

In addition, Patent Document 2 discloses a method for manufacturing an electrical steel sheet containing at least 0.6% by mass and at most 3.0% by mass of Al and describes that an electrical steel sheet in which {100}<011> orientations are integrated on a sheet surface of the steel sheet can be manufactured by a process similar to the method described in Patent Document 1.

On the other hand, Patent Document 3 describes that a finish rolling temperature in hot rolling is set to at least an Ac3 transformation point and a steel sheet temperature is cooled to 250° C. within 3 seconds after hot rolling, or that the finish rolling temperature is set to Ac3 transformation point −50° C. or less, and cooling is performed at a cooling rate equal to or higher than natural cooling. Further, the manufacturing method described in Patent Document 3 is a method for performing cold rolling twice with intermediate annealing interposed therebetween and describes that annealing is not performed between hot rolling and first cold rolling and a cumulative rolling reduction is set to 5 to 15% in second cold rolling. Patent Document 3 describes that, by the above method, an electromagnetic steel sheet integrated in a {100}<011> orientation on a sheet surface of the steel sheet can be manufactured.

In any method described in Patent Documents 1 to 3, when an electrical steel sheet integrated in a {100}<011> orientation on a sheet surface of a steel sheet is manufactured, in the case of setting a finish rolling temperature in hot rolling to at least the Ac3 point, immediate quenching is required. When the quenching is performed, a cooling load after hot rolling increases. In consideration of operational stability, a load on a rolling mill performing cold rolling can be preferably inhibited.

On the other hand, in order to improve magnetic characteristics, a technique of developing a {411} plane rotated 20° from a {100} plane has also been proposed. As methods for developing a {411} plane, Patent Documents 4 to 7 all disclose techniques of developing a {411} plane and describe optimizing grain sizes in a hot-rolled sheet and reinforcing α-fibers in a texture of the hot-rolled sheet.

Specifically, Patent Document 4 describes that cold rolling is performed on a hot-rolled sheet in which a degree of integration of {211} planes is higher than that of {411} planes and a cumulative rolling reduction in cold rolling is set to at least 80%. It is described that, by the above method, an electromagnetic steel sheet integrated with the {411} planes on a sheet surface of the steel sheet can be manufactured.

In addition, Patent Documents 5 and 6 describe that a slab heating temperature is set to at least 700° C. and at most 1150° C., a start temperature of a finish rolling is set to at least 650° C. and at most 850° C., and an end temperature of the finish rolling is set to at least 550° C. and at most 800° C. and describe that a cumulative rolling reduction in cold rolling is set to 85 to 95%. It is described that, by the above method, an electrical steel sheet integrated with {100} planes and {411} planes on a surface of the steel sheet can be manufactured.

On the other hand, Patent Document 7 describes that, when α-fibers are developed in a steel sheet of a hot-rolled coil to the vicinity of a surface layer of the steel sheet by strip casting or the like, {h11}<1/h12> orientations, especially {100}<012> to {411}<148> orientations recrystallize in subsequent hot-rolled plate annealing.

CITATION LIST

Patent Document

[Patent Document 1]
 Japanese Unexamined Patent Application, First Publication No. 2017-145462
[Patent Document 2]
 Japanese Unexamined Patent Application, First Publication No. 2017-193731
[Patent Document 3]
 Japanese Unexamined Patent Application, First Publication No. 2019-178380
[Patent Document 4]
 Japanese Patent No. 4218077
[Patent Document 5]
 Japanese Patent No. 5256916
[Patent Document 6]
 Japanese Unexamined Patent Application, First Publication No. 2011-111658

[Patent Document 7]
  Japanese Unexamined Patent Application, First Publication No. 2019-183185

SUMMARY OF THE INVENTION

Problems to be Solved by the Invention

As a result of the present inventors' studies on the technologies, it has been found that there is a problem that, in the case of attempting improvement of magnetic characteristics by strengthening the {100}<011> orientation according to Patent Documents 1 to 3, quenching immediately after hot rolling is required, and a manufacturing load is high. Further, it has been recognized that, in the case of using a steel sheet reinforced in the {100}<011> orientation as a raw material for a caulked core, core characteristics as expected from the raw material may not be obtained. As a result of studying causes of this, it is considered that, in the {100}<011> orientation, a change in magnetic characteristics against stress, specifically, deterioration of magnetic characteristics (stress sensitivity) in a case in which compressive stress acts increases.

In addition, in the technologies according to Patent Documents 4 to 7, it has been found that, although the {411} plane is developed, integration of the in-plane orientation on the <011> plane is weak, and the magnetic characteristics in a 45° direction from a rolling direction of the steel sheet, which is characteristic of α-fibers, are not of a sufficiently high degree. The fact that the in-plane orientation is not aligned with the <011> plane, that is, that the deviation from the α-fibers is large is a factor that hinders integration on the {411} plane as a plane orientation and may also be considered as a reason why the magnetic characteristics are not sufficiently improved.

Furthermore, with regard to iron loss among the magnetic characteristics, thinning of a sheet thickness was performed in order to reduce iron loss. However, thinning of a sheet thickness leads to a decrease in production efficiency of a motor, and as a method for reducing iron loss while maintaining a sheet thickness, development of the {100} plane, which is advantageous for improving magnetic characteristics by texture control, has been studied. In known technologies, it has been developed through a special process of cold rolling at a high rolling reduction of over 95% and vacuum annealing for over ten hours, and cost reduction is required in industrial production.

In view of the above problems, an object of the present invention is to provide a non-oriented electrical steel sheet that can curb a manufacturing load and has exceptional magnetic characteristics including stress sensitivity and 45° direction characteristics.

Means for Solving the Problem

The present inventors have diligently studied to solve the above problems. As a result, it has become clear that optimizing a chemical composition, grain sizes after hot rolling, and a rolling reduction in cold rolling is effective. Specifically, it is effective, on the premise of a chemical composition of an α-γ transformation system, after hot rolling performed under predetermined conditions, performing cooling under predetermined conditions to optimize grain sizes, performing cold rolling at a predetermined rolling reduction, controlling a temperature for intermediate annealing to be within a predetermined range, and performing annealing after performing second cold rolling (skin pass rolling) at an appropriate rolling reduction, thereby facilitating development of {411}<011> orientation crystal grains, which are usually difficult to develop. The present inventors have made further extensive studies on the basis of these findings, and as a result, have conceived the aspects of the invention indicated below.

(1) A non-oriented electrical steel sheet according to an aspect of the present invention having a chemical composition of, by mass %,
  C: at most 0.0100%,
  Si: 1.5 to 4.0%,
  sol. Al: 0.0001% to 1.000%,
  S: at most 0.0100%,
  N: at most 0.0100%,
  one or more elements selected from the group consisting of Mn, Ni, and Cu: 2.5% to 5.0% in total,
  Co: 0.0% to 1.0%,
  Sn: 0.00% to 0.40%,
  Sb: 0.00% to 0.40%,
  P: 0.000% to 0.400%, and
  one or more elements selected from the group consisting of Mg, Ca, Sr, Ba, Ce, La, Nd, Pr, Zn, and Cd: 0.000% to 0.010% in total,
  with the balance consisting of Fe and impurities,
  wherein, when a Mn content (mass %) is defined as [Mn], a Ni content (mass %) is defined as [Ni], a Cu content (mass %) is defined as [Cu], a Si content (mass %) is defined as [Si], a sol. Al content (mass %) is defined as [sol. Al], and a P content (mass %) is defined as [P], the following expression (1) is satisfied, and
  when an average grain size of {411} crystal grains is defined as $d_{411}$ and an average grain size of {111} crystal grains is defined as $d_{111}$, $d_{411}/d_{111} \geq 1.10$.

$$(2\times[Mn]+2.5\times[Ni]+[Cu])-([Si]+2\times[sol.\ Al]+4\times[P]) \geq 1.5\% \quad (1)$$

Effects of the Invention

According to the above aspect of the present invention, it is possible to provide a non-oriented electrical steel sheet that can curb a manufacturing load and has excellent magnetic characteristics including stress sensitivity and 45° direction characteristics.

Embodiment(s) for Implementing the Invention

Embodiments of the present invention will be described in detail below.

First, chemical compositions of a steel used for a non-oriented electrical steel sheet and a manufacturing method thereof according to embodiments of the present invention and a cold-rolled steel sheet used for manufacturing the non-oriented electrical steel sheet will be described. In the following description, "%," which is a unit of content of each element contained in the non-oriented electrical steel sheet or steel, is "mass %" unless otherwise specified. Also, a numerical range represented using "to" is a range including numerical values stated before and after "to" as lower and upper limits. Any numerical value indicated by "less than" or "exceeding" excludes that value from a numerical range thereof.

The non-oriented electrical steel sheet, the cold-rolled steel sheet, and the steel according to the present embodiment have a chemical composition in which ferrite-austenite transformation (hereinafter, α-γ transformation) may occur. Specifically, they have a chemical composition of C: at most 0.0100%, Si: 1.5 to 4.0%, sol. Al: 0.0001% to 1.000%, S: at most 0.0100%, N: at most 0.0100%, one or more elements selected from the group consisting of Mn, Ni, and Cu: 2.5% to 5.0% in total, Co: 0.0% to 1.0%, Sn: 0.00% to 0.40%, Sb: 0.00% to 0.40%, P: 0.000% to 0.400%, and one or more elements selected from the group consisting of Mg, Ca, Sr, Ba, Ce, La, Nd, Pr, Zn, and Cd: 0.000% to 0.010% in total, with the balance including Fe and impurities. Further, Mn, Ni, Cu, Si, sol. Al, and P contents satisfy predetermined conditions described later.

Examples of the impurities include those contained in raw materials of ores, scrap, and the like, those incorporated in a manufacturing process, and those that are permissible within a range that does not adversely affect characteristics of the non-oriented electrical steel sheet according to the present embodiment.

(C: At Most 0.0100%)

C precipitates fine carbides and hinders grain growth, thereby increasing iron loss of the non-oriented electrical steel sheet and causing magnetic aging. Accordingly, it is preferable that a C content be lower. Such a phenomenon is remarkable when the C content exceeds 0.0100%. For this reason, the C content is 0.0100% or less. Preferably, it is 0.0050% or less, 0.0030% or less, or 0.0020% or less.

Also, although a lower limit of the C content is not particularly limited, it may be 0%. However, since it is difficult to set the C content to 0% in an actual non-oriented electrical steel sheet in terms of refining technology, the C content may be more than 0%. In consideration of decarburizing costs during refining, the C content is preferably 0.0005% or more.

(Si: 1.5% to 4.0%)

Si increases electrical resistance of the non-oriented electrical steel sheet to reduce eddy current loss and core loss and increases the yield ratio to improve punching workability for an iron core. If a Si content is less than 1.5%, these effects cannot be sufficiently obtained. Accordingly, the Si content is 1.5% or more. Preferably, it is 2.0% or more, or 2.4% or more.

On the other hand, if the Si content more than 4.0%, magnetic flux density of the non-oriented electrical steel sheet decreases, punching workability decreases due to an excessive increase in hardness, and it becomes difficult to perform cold rolling. Accordingly, the Si content is 4.0% or less. Preferably, it is 3.5% or less, or 3.0% or less.

(sol. Al: 0.0001% to 1.000%)

Sol. Al increases electrical resistance of the non-oriented electrical steel sheet to reduce eddy current loss and reduce iron loss. Sol. Al also contributes to improving the relative magnitude of magnetic flux density B50 with respect to saturated magnetic flux density. If a sol. Al content is less than 0.0001%, these effects cannot be sufficiently obtained. In addition, sol. Al also has an effect of promoting desulfurization in a steelmaking process. Accordingly, the sol. Al content is 0.0001% or more, and is preferably 0.001% or more, or 0.005% or more.

On the other hand, if the sol. Al content more than 1.000%, magnetic flux density of the non-oriented electrical steel sheet is lowered, and a yield ratio is reduced to reduce punching workability. Accordingly, the sol. Al content is 1.000% or less, and is preferably 0.800% or less, 0.500% or less, or 0.200% or less.

Also, if the sol. Al content is in the range of 0.010% to 0.100%, AlN precipitates and inhibits grain growth, resulting in a large iron loss deterioration allowance, and thus it is preferable to avoid this content range.

Further, in the present embodiment, sol. Al is acid-soluble Al and indicates solid-solution Al existing in steel in a solid-solution state.

(S: 0.0100% or Less)

S is an element that may be contained in steel even if it is not intentionally contained. S hinders recrystallization in intermediate annealing and growth of crystal grains in finish annealing due to precipitation of fine MnS. Accordingly, it is preferable that a S content be lower. An increase in iron loss and a decrease in magnetic flux density of the non-oriented electrical steel sheet caused by such hindrance of recrystallization and grain growth are remarkable when the S content more than 0.0100%. For this reason, the S content is 0.0100% or less. Preferably, it is 0.0050% or less, or 0.0020% or less.

Also, although a lower limit of the S content is not particularly limited, it may be 0%. However, in consideration of desulfurizing costs during refining, it is preferably at least 0.0003%. It is more preferably at least 0.0005%.

(N: 0.0100% or Less)

Since N deteriorates magnetic characteristics of the non-oriented electrical steel sheet by forming fine precipitates such as TiN, AlN, and the like, it is preferable that a N content be lower. In a case in which the N content more than 0.0100%, magnetic characteristics of the non-oriented electrical steel sheet significantly deteriorate. Accordingly, the N content is 0.0100% or less. Preferably, it is 0.0050% or less, or 0.0030% or less.

Also, although a lower limit of the N content is not particularly limited, the N content may be 0%. However, in consideration of denitrifying costs during refining, it is preferably 0.0005% or more, and is more preferably 0.0010% or more.

(One or More Elements Selected from the Group Consisting of Mn, Ni, and Cu: 2.5% to 5.0% in Total)

Since Mn, Ni, and Cu are elements required for causing α-γ transformation, at least one of these elements needs to be contained in a total of 2.5% or more. In addition, it is not necessary to contain all of Mn, Ni, and Cu, and only one of these elements may be contained and its content may be 2.5% or more. The combined Mn, Ni, and Cu content is preferably 2.8% or more, 3.0% or more, or 3.7% or more.

On the other hand, if the total content of these elements more than 5.0%, alloy costs may increase and magnetic flux density of the non-oriented electrical steel sheet may decrease. Accordingly, the total content of these elements is 5.0% or less. Preferably, it is 4.0% or less.

In the present embodiment, the chemical composition of the non-oriented electrical steel sheet further satisfies the following conditions as conditions under which α-γ transformation may occur. That is, when the Mn content (mass %) is defined as [Mn], the Ni content (mass %) is defined as [Ni] the Cu content (mass %) is defined as [Cu], the Si content (mass %) is defined as [Si], the sol. Al content (% by mass) is defined as [sol. Al], and the P content (% by mass) is defined as [P], the following expression (1) is satisfied in terms of mass %.

$$(2\times[Mn]+2.5\times[Ni]+[Cu])-([Si]+2\times[sol.\ Al]+4\times[P]) \geq 1.5\% \tag{1}$$

In a case in which the above expression (1) is not satisfied, α-γ transformation does not occur, and thus magnetic flux density of the non-oriented electrical steel sheet decreases. The left side of the expression (1) is preferably 2.00% or more, 3.00% or more, or 3.40% or more.

Although an upper limit of the left side of the expression (1) is not particularly limited, it may be 10.00% or less, at most 6.00% or less, or at most 5.00% or less.

(Co: 0.0% to 1.0%)

Since Co is an effective element for causing α-γ transformation, it may be contained if required. However, if Co is contained excessively, alloy costs may increase and magnetic flux density of the non-oriented electrical steel sheet may decrease. Accordingly, a Co content is 1.0% or less. Preferably, it is 0.5% or less.

Also, the Co content may be 0.0%. However, in order to stably cause α-γ transformation, the Co content is preferably 0.01% or more and more preferably 0.1% or more.

(Sn: 0.00% to 0.40%, and Sb: 0.00% to 0.40%)

Sn and Sb improve texture after cold rolling and recrystallization and increase magnetic flux density of the non-oriented electrical steel sheet. For that reason, these elements may be contained if desired, but if they are contained excessively, they embrittle the steel. Accordingly, both a Sn content and a Sb content are 0.40% or less. Both are preferably 0.20% or less.

Also, both the Sn content and the Sb content may be 0.0%. However, in the case of imparting an effect of improving magnetic flux density of the non-oriented electrical steel sheet as described above, the Sn content or Sb content is preferably 0.02% or more.

(P: 0.000% to 0.400%)

P may be contained in order to ensure hardness of the non-oriented electrical steel sheet after grain growth (after finish annealing), but if contained excessively, it causes embrittlement of steel. Accordingly, the P content is 0.400% or less. Preferably, it is 0.100% or less, or 0.050% or less.

Although a lower limit of the P content is not particularly limited, it may be 0.000%, or may be 0.005% or more, or 0.010% or more. In the case of imparting further effects such as improvement of magnetic characteristics, the P content is preferably 0.020% or more.

(One or More Elements Selected from the Group Consisting of Mg, Ca, Sr, Ba, Ce, La, Nd, Pr, Zn, and Cd: 0.000% to 0.010% in Total)

Mg, Ca, Sr, Ba, Ce, La, Nd, Pr, Zn, and Cd react with S in molten steel during casting of the molten steel to generate sulfide or oxysulfide or both precipitates. Hereinafter, Mg, Ca, Sr, Ba, Ce, La, Nd, Pr, Zn, and Cd may be collectively referred to as "coarse precipitate generating elements." Grain sizes of the precipitates generated by the coarse precipitate generating elements are about 1 μm to 2 μm, which are much larger than grain sizes (about 100 nm) of fine precipitates such as MnS, TiN, and AlN. For this reason, these fine precipitates adhere to the precipitates generated by the coarse precipitate generating elements and are less likely to hinder recrystallization and grain growth during annealing such as intermediate annealing. As a result, since an average grain size can be preferably controlled in the non-oriented electrical steel sheet, the coarse precipitate generating elements may be contained if required. In order to sufficiently obtain the above effects, the total content of the coarse precipitate generating elements is preferably 0.0005% or more. More preferably, it is 0.001% or more, or 0.004% or more.

However, if the total content of the coarse precipitate generating elements more than 0.010%, a total amount of the sulfide, the oxysulfide, or both becomes excessive, which hinders recrystallization and grain growth in annealing such as intermediate annealing. Accordingly, the total content of the coarse precipitate generating elements is 0.010% or less. It is preferably 0.007% or less.

Next, a method for measuring an average grain size of crystal grains having a specific orientation (specific orientation grains) of the non-oriented electrical steel sheet according to the present embodiment will be described. The average grain size of the specific orientation grains is measured by electron back scattering diffraction (EBSD) employing the following measurement conditions using OIM Analysis 7.3 (manufactured by TSL). As measuring devices therefor, for example, an EBSD detector and a scanning electron microscope (SEM) are used. The specific orientation grains serving as a target are extracted from a measurement region (a tolerance is set to 10°, which is referred to as tolerance within 10° below). Then, grain sizes of the extracted specific orientation grains are obtained as circle equivalent diameters using analysis software. The grain sizes of all specific orientation grains in one measurement region (field of view) are obtained, and a number average thereof is taken as the average grain size of the specific orientation grains.

In the non-oriented electrical steel sheet according to the present embodiment, in a case in which the average grain size of {411} crystal grains is defined as $d_{411}$ and the average grain size of {111} crystal grains is defined as $d_{111}$ when measured by EBSD with the tolerance within 10°, they are set to $d_{411}/d_{111} \geq 1.10$. If $d_{411}/d_{111}$ is less than 1.10, excellent magnetic characteristics cannot be obtained in the non-oriented electrical steel sheet. Accordingly, they are set to $d_{411}/d_{111} \geq 1.10$. They are preferably set to $d_{411}/d_{111} \geq 1.12$.

Although an upper limit of $d_{411}/d_{111}$ is not particularly limited, $d_{411}/d_{111}$ may be 1.30 or less, 1.20 or less, or 1.18 or less.

Further, details of the measurement conditions for obtaining the average grain size of the specific orientation grains are as follows.

Measurement device: SEM model number "JSM-6400 (manufactured by JEOL)" and EBSD detector model number "HIKARI (manufactured by TSL)" are used.

Step interval: 0.3 μm (after intermediate annealing and after skin pass rolling) or 5.0 μm (after finish annealing)

Magnification: 1000 times (after intermediate annealing and after skin pass rolling) or 100 times (after finish annealing)

Measurement target: a center layer (½ sheet thickness) of a Z surface (a sheet surface perpendicular to a sheet thickness direction) at a center of in a steel sheet in a C direction (width direction)

In addition, it is preferable to reduce the thickness by polishing to expose a ½ portion of the sheet thickness.

Measurement region: a region of 1000 μm or more in a L direction and 1000 μm or more in the C direction In addition, it is preferable that, when measured by EBSD, the non-oriented electrical steel sheet according to the present embodiment have the maximum strength at φ1=0 to 10° in φ1=0 to 90° and Φ=20° and have the maximum strength at Φ=5 to 35° in φ1=0° and Φ=0 to 90°. Having the maximum strength at φ1=0 to 10° in φ1=0 to 90° and Φ=20° is synonymous with having the maximum strength near a {411}<011> orientation among {411}<uvw> orientations. If this condition is satisfied, the {411}<011> orientation grains can be appropriately grown, and an average grain size of {411} crystal grains is large. The {411}<011> orientation is superior to a {411}<148> orientation and the like in 45° direction magnetic characteristics. Also, when the maximum strength is at φ1=20 to 30° in φ1=0 to 90° and Φ=20°, the maximum strength is near the {411}<148> orientation, which is not preferable.

It is more preferable to have the maximum strength at $\varphi 1=0$ to 5° in $\varphi 1=0$ to 90° and $\Phi=20°$.

On the other hand, having the maximum strength at $\Phi=5$ to 35° in $\varphi 1=0°$ and $\Phi=0$ to 90° when measured by EBSD is synonymous with having the maximum strength near a {411}<011> orientation among {hkl}<011> orientations. If this condition is satisfied, the {411}<011> orientation grains can be appropriately grown, and the average grain size of the {411} crystal grains is large. The {411}<011> orientation is excellent in magnetic characteristics and has a lower stress sensitivity than a {100}<011> orientation, and thus deterioration of the magnetic characteristics in a caulked core or the like is small. Also, when the maximum strength is at $\Phi=0$ to 3° in $\Phi=0°$ and $\Phi=0$ to 90°, the maximum strength is near the {100}<011> orientation, which is not preferable.

It is more preferable to have the maximum strength at $\Phi=20$ to 30° in $\varphi 1=0°$ and $\Phi=0$ to 90°.

Here, a method for determining the maximum strength within a specific orientation range in the non-oriented electrical steel sheet will be described. In the measurement region by EBSD, an orientation distribution function (ODF) is created under the following conditions using OMI Analysis 7.3. Then, data of the created ODF is output, and the maximum strength is determined at a location at which an ODF value is maximum within a specific orientation range (the range is defined by angles of $\varphi 1$ and $\Phi$).

In addition, a method for determining an ODF strength of a specific orientation in the non-oriented electrical steel sheet will be described. In the measurement region by EBSD, ODF is created under the following conditions using OMI Analysis 7.3. Then, data of the created ODF is output, and the ODF value of a specific orientation (the orientation is defined by angles of $\varphi 1$ and $\Phi$) is determined as the ODF strength.

Also, details of creation conditions of ODF are as follows.
Series Rank [L]: 16
Gaussian Half-Width [degrees]: 5
Sample Symmetry: Triclinic (None)
Bunge Euler Angles: $\varphi 1=0$ to 90°, $\varphi 2=45°$, $\Phi=0$ to 90°

Next, the sheet thickness of the non-oriented electrical steel sheet according to the present embodiment will be described. The sheet thickness of the non-oriented electrical steel sheet according to the present embodiment is not particularly limited. The preferred sheet thickness of the non-oriented electrical steel sheet according to the present embodiment is 0.25 to 0.5 mm. Generally, if a sheet thickness becomes thinner, iron loss decreases, and magnetic flux density decreases. In consideration of this point, if the sheet thickness is 0.25 mm or more, iron loss decreases, and magnetic flux density increases. Also, if the sheet thickness is 0.5 mm or less, low iron loss can be maintained. A more preferable lower limit of the sheet thickness is 0.3 mm.

Features of the non-oriented electrical steel sheet according to the present embodiment described above are features of the non-oriented electrical steel sheet manufactured by performing finish annealing.

Features of the non-oriented electrical steel sheet before finish annealing is performed (and after skin pass rolling is performed) will be described below.

The non-oriented electrical steel sheet after skin pass rolling (before finish annealing) has the following grain orientation spread (GOS) value. Here, the GOS value is an average of orientation differences between all measurement points (pixels) in the same grain, and the GOS value increases in crystal grains with much strain. In the non-oriented electrical steel sheet after skin pass rolling, if a number average value Gs of the GOS value is small, that is, in a low strain state, grain growth due to bulging is likely to occur in the subsequent finish annealing. Accordingly, the number average value Gs of the GOS values after skin pass rolling is preferably 3.0 or less.

On the other hand, if the number average value Gs of the GOS value is less than 0.8, a strain amount becomes too small, and a finish annealing time required for grain growth due to bulging becomes longer. Accordingly, the number average value Gs of the GOS values after skin pass rolling is preferably 0.8 or more.

Here, a method for calculating the GOS value for non-oriented electrical steel sheet will be described. Using the EBSD data obtained when the average grain size of the above specific orientation grains is measured, a number average value of GOS values is obtained by performing analysis with OIM Analysis 7.3. Thus, Gs is obtained.

In addition, in the non-oriented electrical steel sheet after skin pass rolling (before finish annealing), magnetic characteristics after finish annealing become superior as an $\alpha$ fiber ratio increases. Here, a method for measuring the $\alpha$ fiber ratio will be described. In the present embodiment, $\alpha$-fibers are defined as crystal grains having {hkl}<011> crystal orientations. In the measurement region by EBSD, crystal grains having crystal orientations of the {hkl}<011> orientations (the tolerance within 10°) are extracted using OMI Analysis 7.3. An area of the extracted crystal grains is divided by an area of the measurement region to obtain the percentage. This percentage is defined as the $\alpha$-fiber ratio.

In the non-oriented electrical steel sheet after skin pass rolling (before finish annealing), the $\alpha$ fiber ratio is preferably 20% or more. It is more preferably 25% or more.

Further, in the non-oriented electrical steel sheet after skin pass rolling (before finish annealing), the ODF strength of the {100}<011> orientation is set to 15 or less. Here, the ODF strength of the {100}<011> orientation is an ODF Value at $\varphi 1=0°$ and $\Phi=0°$ of the ODF created using the EBSD data when the average grain size of the specific orientation grains is measured. Since the {411}<011> orientation has excellent magnetic characteristics and has lower stress sensitivity than the {100}<011> orientation, magnetic deterioration in a caulked core or the like is small. By setting the ODF strength of the {100}<011> orientation after skin pass rolling (before finish annealing) to at most 15, the {411}<011> orientation after subsequent finish annealing can be strengthened.

By forming a core, the non-oriented electrical steel sheet according to the present embodiment can be widely applied to applications requiring magnetic characteristics (high magnetic flux density and low iron loss). Applications of the core are, for example, as follows.

(A) Servo motors, stepping motors, and compressors used in electrical devices
(B) Drive motors used in electric vehicles and hybrid vehicles. Here, vehicles include automobiles, motorcycles, railways, and the like.
(C) Generators
(D) Iron cores, choke coils, and reactors for various applications
(E) Current sensors, and the like The non-oriented electrical steel sheet according to the present embodiment can also be applied to uses other than the above uses (A) to (E). The non-oriented electrical steel sheet according to the present embodiment is particularly appropriate for a split core designed so that a main magnetization direction of the core is in a direction inclined by 45° from a rolling direction of the steel sheet (45° direction). Moreover, the non-oriented electrical steel sheet according to the present embodiment is appropriate for a split core of drive motors of electric vehicles or hybrid vehicles, and the like, which are applied to a high frequency range of 1000 Hz or more.

Next, an example of a method for manufacturing the non-oriented electrical steel sheet according to the present embodiment will be described. In the present embodiment, hot rolling, cold rolling, intermediate annealing, second cold rolling (skin pass rolling), and finish annealing are performed.

In the hot rolling, a hot-rolled sheet is manufactured by performing hot rolling on a steel that satisfies the chemical composition described above. The hot rolling process includes a heating process and a rolling process.

The steel is, for example, a slab manufactured by normal continuous casting, and the steel with the chemical composition described above is manufactured by a well-known method. For example, molten steel is manufactured in a converter or an electric furnace. The manufactured molten steel is subjected to secondary refining in degassing equipment or the like to obtain molten steel having the chemical composition described above. The slab is cast by a continuous casting method or an ingot casting method using the molten steel. The cast slab may be bloomed.

In the heating process, it is preferable to heat the steel having the chemical composition described above to 1000 to 1200° C. Specifically, the steel is charged into a heating furnace or soaking furnace and heated in the furnace. A holding time at the above heating temperature in the heating furnace or soaking furnace is not particularly limited, but is, for example, 30 to 200 hours.

In the rolling process, the steel heated in the heating process is rolled multiple passes to manufacture a hot-rolled sheet. Here, the "pass" indicates that a steel sheet passes through one rolling stand having a pair of work rolls and is subjected to reduction. In the hot rolling, for example, tandem rolling may be performed using a tandem rolling mill including a plurality of rolling stands (each rolling stand having a pair of work rolls) arranged in a row to perform multiple pass rolling, or reverse rolling with a pair of work rolls may be performed to perform multiple pass rolling. From the viewpoint of productivity, it is preferable to perform multiple rolling passes using a tandem rolling mill.

Rolling in the rolling process (rough rolling and finish rolling) is performed at a temperature in the γ region (the Ar1 point or more). That is, hot rolling is performed so that a temperature (finish rolling temperature FT (° C.)) at the time of passing through a final pass of the finish rolling is the Ar1 point or more. In a case in which the finish rolling temperature FT (° C.) is less than the Ar1 point, an average grain size ratio ($d_{411}/d_{111}$) of the finally obtained non-oriented electrical steel sheet decreases, and the magnetic flux density B50 (45° direction), iron loss W10/400, and an iron loss deterioration rate may deteriorate. For that reason, in the rolling process, hot rolling is performed so that the finish rolling temperature FT (° C.) is the Ar1 point or more. In order to sufficiently increase the average grain size ratio ($d_{411}/d_{111}$), the finish rolling temperature FT (° C.) is preferably set to 840° C. or higher.

Also, hot rolling is preferably performed so that the finish rolling temperature FT is the Ac3 point or less. By performing the hot rolling so that the finish rolling temperature FT is the Ac3 point or less, strain can be preferably introduced into the crystal grains in coordination with cooling, which will be described later, and as a result, the {411}<011> orientation grains can be developed. If the finish rolling temperature FT exceeds the Ac3 point, the strain may not be preferably introduced into the crystal grains, and as a result, the {411}<011> orientation grains may not be developed.

Also, the Ar1 point can be obtained from a change in thermal expansion of the steel sheet during cooling at an average cooling rate of 1° C./sec. Further, the Ac3 point and the Ac1 point described later can be obtained from a change in thermal expansion of the steel sheet during heating at an average heating rate of 1° C./sec.

Here, the finish rolling temperature FT is a surface temperature (° C.) of the steel sheet on an exit side of a rolling stand at which a final pass reduction is performed in the above rolling process during the hot rolling process. The finish rolling temperature FT can be measured, for example, by a thermometer provided on the exit side of the rolling stand that performs the final pass reduction. Also, the finish rolling temperature FT is, for example, an average value of temperature measurement results at portions excluding one section at a front end and one section at a rear end in the case of dividing a total length of the steel sheet into 10 equal sections in the rolling direction.

After that, by cooling after the rolling process, austenite is transformed into ferrite, and thus moderately fine crystal grains having much strain can be obtained. As for cooling conditions, cooling is started 0.10 seconds after passing through a final pass of the finish rolling, and after 3 seconds, the surface temperature of the hot-rolled sheet is cooled to 300° C. or higher and the Ar1 point or lower. Here, in the present embodiment, it is not preferable to perform quenching immediately after the hot rolling. The quenching immediately after the hot-rolled sheet (immediate quenching) as used herein indicates cooling performed such that water cooling is started within 0.10 seconds after passing through the final pass of the finish rolling, or the surface temperature of the hot-rolled sheet after 3 seconds is lower than 300° C. Such immediate quenching can be performed by performing water cooling so that work rolls in the final pass of the finish rolling are sprayed with water without performing air cooling after the finish rolling. In the present embodiment, since such immediate quenching is not performed, a special quenching device is not required, which is advantageous in terms of manufacturing costs. In addition, by performing cooling other than the immediate quenching as described above, appropriate grain sizes that are not excessively refined are obtained, and by performing the cold rolling thereafter, the α-fibers can be developed after the intermediate annealing, and the {411}<011> orientation, which is usually difficult to develop, can be developed after subsequent skin pass rolling and finish annealing.

Also, although a cooling stop temperature in the cooling after the hot rolling process is not particularly limited, it is preferably set to a temperature range of 500° C. or lower from the viewpoint of maintaining the strain amount.

In addition, it is inferred that a texture of the hot-rolled sheet becomes a structure in which non-recrystallized austenite is transformed when the immediate quenching is performed and becomes a structure in which partially recrystallized austenite is transformed when cooling is performed instead of the immediate quenching. In the case of performing the immediate quenching after the finish rolling, integration occurs in the {100}<011> orientation in the structure after the subsequent finish annealing, and in the case of performing the cooling other than the immediate quenching after the finish rolling, integration occurs in the {411}<011> orientation in the structure after the subsequent finish annealing. Accordingly, it is considered that transformation of the partially recrystallized austenite is important for strengthening the {411}<011> orientation.

Here, that the cooling conditions are preferably set such that the average grain size of the hot-rolled sheet before the cold rolling is 3 to 10 μm. If the crystal grains are too coarse, the α-fibers after the cold rolling and the intermediate annealing become difficult to develop, and a desired average grain size ratio ($d_{411}/d_{111}$) may not be obtained. Also, if the grains are excessively refined, the desired average grain size ratio ($d_{411}/d_{111}$) may not be obtained. Accordingly, in order to set the average grain size in the hot-rolled sheet before the cold rolling to 3 to 10 μm, it is preferable to set the temperature to the Ar1 point or less within 3 seconds after passing through the final pass of the finish rolling. The grain sizes are measured by, for example, a cutting method.

Also, the surface temperature of the hot-rolled sheet 3 seconds after passing through the final pass of the finish rolling is measured by the following method. In a hot rolling equipment line for the non-oriented electrical steel sheet, a cooling device and a transfer line (for example, transfer rollers) are disposed downstream from the hot rolling mill. A thermometer for measuring the surface temperature of the hot-rolled sheet is disposed on the exit side of the rolling stand that performs the final pass of the hot rolling mill. In addition, a plurality of thermometers are also arranged along the transfer line in the transfer rollers disposed downstream from the rolling stand. The cooling device is located downstream from the rolling stand that performs the final pass. A thermometer is disposed on an entry side of a water cooling device. The cooling device may be, for example, a known water cooling device or a known forced air cooling device. The cooling device is preferably a water cooling device. A coolant of the water cooling device may be water or a mixed fluid of water and air.

The surface temperature of the hot-rolled sheet is measured with the thermometers disposed in the hot rolling equipment line. Then, the temperature 3 seconds after passing through the final pass of the finish rolling is obtained.

After that, the hot-rolled sheet is wound up without performing hot-rolled sheet annealing, and the cold rolling is performed thereon. Also, the hot-rolled sheet annealing used herein is, for example, heat treatment performed on a hot-rolled sheet at a heating temperature in the temperature range of 800 to 1100° C. A holding time at the heating temperature during the hot-rolled sheet annealing is, for example, 1 minute or more.

When the hot-rolled sheet annealing is performed, the strain in the crystal grains cannot be preferably controlled, and as a result, the {411}<011> orientation grains cannot be grown to a desired grain size, which is not preferable.

The hot-rolled sheet annealing is not performed on the hot-rolled sheet, and the cold rolling is performed on the hot-rolled sheet. The cold rolling is performed, for example, by performing tandem rolling using a tandem rolling mill including a plurality of rolling stands arranged in a row (each rolling stand having a pair of work rolls) to perform multiple pass rolling. Also, reverse rolling may be performed by a Sendzimir rolling mill or the like having a pair of work rolls to perform single pass or multiple pass rolling. From the viewpoint of productivity, it is preferable to perform multiple pass rolling using a tandem rolling mill.

In the cold rolling, cold rolling is performed without performing annealing treatment during the cold rolling. For example, when reverse rolling is performed and cold rolling is performed multiple passes, multiple pass cold rolling is performed without interposing annealing treatment between passes of the cold rolling. In addition, the cold rolling may be performed only one pass using a reverse type rolling mill. Further, when cold rolling is performed using a tandem rolling mill, the cold rolling is continuously performed multiple passes (passes in each rolling stand).

Also, in the case of performing annealing during cold rolling to prevent brittle cracking, cold rolling with a small rolling reduction (for example, about 10%) is often performed before and after the annealing. For that reason, the "annealing during cold rolling" used herein and the "intermediate annealing" performed before the skin pass rolling in the present embodiment can be distinguished from each other by a difference in rolling reduction of cold rolling before annealing. Further, in the case of performing annealing between cold rollings by a double cold rolling method or the like, cold rolling with a high rolling reduction (for example, about 40%) is often performed after the annealing. For that reason, the "annealing between cold rollings" used herein and the "intermediate annealing" performed before the skin pass rolling in the present embodiment can be distinguished from each other by rolling reductions of subsequent cold rollings.

In the present embodiment, it is preferable that a rolling reduction RR1 (%) in the cold rolling is 75 to 95%. Here, the rolling reduction RR1 is defined as follows.

Rolling reduction RR1 (%)=(1−sheet thickness after final pass rolling in cold rolling/sheet thickness before first pass rolling in cold rolling)×100

After the cold rolling is completed, the intermediate annealing is performed. In the present embodiment, it is preferable to control an intermediate annealing temperature T1 (° C.) to the Ac1 point or less. If the intermediate annealing temperature exceeds the Ac1 point, part of the structure of the steel sheet transforms into austenite, resulting in an excessive reduction in strain in the steel sheet. In addition, if the intermediate annealing temperature is too low, recrystallization does not occur, and the {411}<011> orientation grains do not grow sufficiently during the subsequent skin pass rolling and finish annealing, and the magnetic flux density of the non-oriented electrical steel sheet may not increase. Accordingly, the intermediate annealing temperature T1 (° C.) is preferably 600° C. or higher.

Here, the intermediate annealing temperature T1 (° C.) is a sheet temperature near an extraction port of an annealing furnace (a temperature of a surface of the steel sheet). The sheet temperature of the annealing furnace can be measured by a thermometer disposed at the extraction port of the annealing furnace.

Also, a holding time at the intermediate annealing temperature T1 in the intermediate annealing process may be a time well known to those skilled in the art. The holding time at the intermediate annealing temperature T1 is, for example, 5 to 60 seconds, but the holding time at the intermediate annealing temperature T1 is not limited thereto. Further, a heating rate up to the intermediate annealing temperature T1 may also be under known conditions. The heating rate up to the intermediate annealing temperature T1 is, for example, 10.0 to 20.0° C./sec, but the heating rate up to the intermediate annealing temperature T1 is not limited thereto.

Although an atmosphere during the intermediate annealing is not particularly limited, for example, an atmosphere gas (dry) containing 20% $H_2$ and the balance being $N_2$ is used for the atmosphere during the intermediate annealing. The cooling rate of the steel sheet after the intermediate annealing is not particularly limited, and the cooling rate is, for example, 5.0 to 60.0° C./sec.

When the intermediate annealing is completed under the above conditions, the obtained cold-rolled steel sheet has the α-fiber ratio (tolerance within 10°) of 15% or more when measured by EBSD. In order to make the α-fiber ratio (tolerance within) 10° 15% or more at a stage before the skin pass rolling in this way, it is effective to set the chemical composition of the α-γ transformation system (the chemical composition having a high concentration of γ-former elements of Mn, Ni, and Cu), and to set the above-described conditions from the hot rolling to the intermediate annealing, and it is particularly effective to control the cooling conditions after the finish rolling. By transforming the partially recrystallized austenite into ferrite, performing the cold rolling on the hot-rolled sheet having the average grain size after the hot rolling of 3 to 10 μm, and then performing the intermediate annealing thereon, the α-fibers that are likely to generate the {411}<011> orientation are developed. As described above, if the immediate quenching is performed after the finish rolling, the structure is transformed from non-recrystallized austenite, and is not transformed from the partially recrystallized austenite.

By subjecting the cold-rolled steel sheet manufactured by the above-described method to the skin pass rolling and the finish annealing under the conditions described later, the non-oriented electrical steel sheet according to the present embodiment can be obtained.

After the intermediate annealing is completed, the skin pass rolling is performed next. Specifically, the skin pass rolling (cold rolling with a light rolling reduction) is performed on the cold-rolled steel sheet after the intermediate annealing process at room temperature in the atmosphere. The skin pass rolling here uses, for example, a reverse rolling mill typified by the Sendzimir rolling mill described above, or a tandem rolling mill.

In the skin pass rolling, rolling is performed without performing annealing treatment in the middle. For example, in the case of performing reverse rolling and performing skin pass rolling multiple passes, the rolling is performed a plurality of times without interposing annealing treatment between the passes. Also, the skin pass rolling may be performed only one pass using a reverse rolling mill. Moreover, in the case of performing the skin pass rolling using a tandem rolling mill, the rolling is continuously performed multiple passes (passes in each rolling stand).

As described above, in the present embodiment, after the strain is introduced into the steel sheet by the hot rolling and the cold rolling, the strain introduced into the steel sheet is temporarily reduced by the intermediate annealing. Then, the skin pass rolling is performed. Thus, by performing the intermediate annealing while reducing the strain excessively introduced by the cold rolling in the intermediate annealing, preferential recrystallization of the crystal grains having a crystal orientation of {111} plane in a sheet surface of the steel sheet is inhibited, and the crystal grains having a crystal orientation of the {411}<011> orientation are left. Then, an appropriate strain amount is introduced into each crystal grain in the steel sheet in the skin pass rolling, and thus it is brought into a state in which grain growth due to bulging is likely to occur in the next process of the finish annealing.

In the present embodiment, a rolling reduction RR2 in the skin pass rolling is set to 5 to 20%. Here, the rolling reduction RR2 is defined as follows.

Rolling reduction RR2 (%)=(1−sheet thickness after final pass rolling in skin pass rolling/sheet thickness before first pass rolling in skin pass rolling)×100

Here, if the rolling reduction RR2 is less than 5%, the strain amount becomes too small, and the finish annealing time required for grain growth due to bulging becomes longer. On the other hand, if the rolling reduction RR2 is more than 20%, the strain amount becomes too large, normal grain growth occurs instead of bulging, and the {411}<148> and {111}<011> orientations grow during the finish annealing. Accordingly, the rolling reduction RR2 is set to 5 to 20%.

The number of passes in the skin pass rolling may be only one pass (that is, only one rolling), or may be multiple pass rolling.

As described above, the steel sheet with the chemical composition of the α-γ transformation system is recrystallized in the intermediate annealing, and the skin pass rolling is performed under the above conditions, whereby the GOS value and the α-fiber ratio described above are obtained.

After the skin pass rolling, the finish annealing is performed under the conditions that the finish annealing temperature T2 is in the temperature range of 750° C. or higher and the Ac1 point or less, and the holding time (finish annealing time Δt2) in the temperature range is 2 hours or more. If the finish annealing temperature T2 (° C.) is lower than 750° C., sufficient grain growth due to bulging does not occur. In this case, a degree of integration in the {411}<011> orientation is lowered. Also, if the finish annealing temperature T2 exceeds the Ac1 point, part of the structure of the steel sheet is transformed into austenite, grain growth due to bulging does not occur, and the desired average grain size ratio ($d_{411}/d_{111}$) cannot be obtained. In addition, if the finish annealing time Δt2 is less than 2 hours, grain growth due to bulging does not occur sufficiently even when the finish annealing temperature T2 is 750° C. or higher and the Ac1 point or less, and the degree of integration in the {411}<011> orientation decreases. Further, an upper limit of the annealing time of the finish annealing is not particularly limited, but the effects are saturated even if the finish annealing time Δt2 exceeds 10 hours, and thus a preferred upper limit thereof is 10 hours.

Here, the finish annealing temperature T2 is a sheet temperature near the extraction port of the annealing furnace (a temperature of the surface of the steel sheet). The furnace temperature of the annealing furnace can be measured by a thermometer disposed at the extraction port of the annealing furnace.

Also, heating rate TR2 up to the finish annealing temperature T2 in the finish annealing process may be a heating rate known to those skilled in the art. Here, the holding time Δt2 is a holding time after the surface temperature of the steel sheet reaches the finish annealing temperature T2.

A preferred heating rate TR2 up to the finish annealing temperature T2 in the finish annealing process is 0.1° C./sec or more and less than 10.0° C./sec. If the heating rate TR2 is 0.1° C./sec or more and less than 10.0° C./sec, sufficient grain growth occurs due to bulging. In this case, the degree of integration in the {411}<011> crystal orientation is further increased, and crystal grains on an ND plane at a central position of the sheet thickness are also less likely to vary.

The heating rate TR2 is obtained by the following method. A thermocouple is attached to the steel sheet having the chemical composition described above and obtained by performing the processes from the hot rolling to the skin pass to obtain a sample steel sheet. The sample steel sheet to which the thermocouple is attached is heated, and the time from the start of heating to the final annealing temperature T2 is measured. The heating rate TR2 is obtained on the basis of the measured time.

The holding time Δt2 at the finish annealing temperature T2 in the finish annealing process is 2 hours or more. If the holding time Δt2 is 2 hours or more, sufficient grain growth of {411}<110> grains occurs due to bulging. In this case, the degree of integration in the {411}<011> crystal orientation is further increased, and the crystal grains on the ND plane at the central position of the sheet thickness are also less likely to vary. A lower limit of the holding time Δt2 is 2 hours or more and preferably 3 hours or more. As described above, a preferred upper limit of the holding time Δt2 is hours or less and more preferably 5 hours or less.

The atmosphere during the finish annealing process is not particularly limited. For the atmosphere during the final annealing process, for example, an atmospheric gas (dry) containing 20% $H_2$ and the balance being $N_2$ is used. The cooling rate of the steel sheet after the finish annealing is not particularly limited. The cooling rate is, for example, 5 to 20° C./sec.

Also, in the method for manufacturing the non-oriented electrical steel sheet according to the present embodiment, the finish annealing may not be performed. That is, the non-oriented electrical steel sheet according to the present embodiment may have a form in which a non-oriented electrical steel sheet after the skin pass rolling is shipped. In such a case, for example, the processes up to the skin pass rolling may be performed at a steel sheet manufacturing company, and the non-oriented electrical steel sheet may be punched or stacked at a core manufacturing company, which is a shipping destination, and then strain relief annealing may be performed instead of the finish annealing. The strain relief annealing in this case may be performed under the conditions that an annealing temperature is in the temperature range of 750° C. or more and the Ac1 point or less, and an annealing time is 2 hours or more.

In this way, the non-oriented electrical steel sheet according to the present embodiment can be manufactured.

The method for manufacturing the non-oriented electrical steel sheet according to the present embodiment is not limited to the manufacturing process described above.

For example, among the above manufacturing process, shot blasting and/or pickling may be performed after the hot rolling and before the cold rolling. In the shot blasting, shot blasting is performed on the steel sheet after the hot rolling to break and remove scales formed on the sheet surface of the steel sheet after the hot rolling. In the pickling, pickling treatment is performed on the steel sheet after the hot rolling. For the pickling treatment, for example, an aqueous solution of hydrochloric acid is used as a pickling bath. The pickling removes the scales formed on the sheet surface of the steel sheet. After the hot rolling and before the cold rolling, shot blasting may be performed and then pickling may be performed. Also, pickling may be performed after the hot rolling and before the cold rolling and shot blasting may not be performed. Shot blasting may be performed after the hot rolling and before the cold rolling and pickling treatment may not be performed. Further, shot blasting and pickling are optional processes. Accordingly, after the hot rolling and before the cold rolling, both the shot blasting process and the pickling process may not be performed.

In the method for manufacturing the electrical steel sheet according to the present embodiment, coating may be performed after the finish annealing. In the coating, an insulating coating is formed on the surface of the steel sheet after the final annealing.

A type of the insulating coating is not particularly limited. The insulating coating may be an organic component or an inorganic component, and the insulating coating may contain organic and inorganic components. Examples of the inorganic component include dichromic acid-boric acid-based components, phosphoric acid-based components, silica-based components, and the like. Examples of the organic component include, for example, general acryl-based resins, acrylic styrene-based resins, acrylic silicone-based resins, silicone-based resins, polyester-based resins, epoxy-based resins, and fluorine-based resins. In consideration of coating characteristics, a preferred resin is an emulsion type resin. An insulating coating that shows adhesiveness by applying heat and/or pressure may be applied. Example of the adhesive insulating coating include, for example, acryl-based resins, phenol-based resins, epoxy-based resins, and melamine-based resins.

Also, the coating is an optional process. Accordingly, the coating may not be performed after the final annealing.

Also, the non-oriented electrical steel sheet according to the present embodiment is not limited to the manufacturing method described above. As far as $d_{411}/d_{111} \geq 1.10$ is satisfied when measured by EBSD, the manufacturing method is not limited to the above.

EXAMPLES

Next, the non-oriented electrical steel sheet according to the embodiment of the present invention will be specifically described with reference to examples. The examples shown below are merely examples of the non-oriented electrical steel sheet according to the embodiment of the present invention, and the non-oriented electrical steel sheet according to the present invention is not limited to the following examples.

First Examples

By casting molten steel, an ingot with the components shown in Table 1 below was produced. Here, the left side of the expression represents the value of the left side of the above expression (1). Also, Mg and the like represent a sum total of one or more elements selected from the group consisting of Mg, Ca, Sr, Ba, Ce, La, Nd, Pr, Zn, and Cd. After that, the produced ingot was heated to 1150° C. and subjected to the hot rolling, and the finish rolling was performed thereon at the finish rolling temperature FT shown in Table 2. Then, after passing through the final pass, cooling was performed under the cooling conditions shown in Table 2 (the time from passing through the final pass until the start of cooling, and the temperature of the steel sheet 3 seconds after passing through the final pass).

Next, the hot-rolled sheet was not subjected to hot-rolled sheet annealing, and was pickled to remove scales, and cold-rolled at the rolling reduction RR1 shown in Table 2. Then, the intermediate annealing was performed in an atmosphere of 20% hydrogen and 80% nitrogen, and the intermediate annealing was performed for 30 seconds while controlling the intermediate annealing temperature T1 to the temperature shown in Table 2.

Next, except for No. 11, the skin pass rolling was performed at the rolling reduction RR2 shown in Table 2. Then, the finish annealing was performed at the finish annealing temperature T2 shown in Table 2 in an atmosphere of 100% hydrogen. In this case, the holding time Δt2 at the finish annealing temperature T2 was set to the time shown in Table 2. Also, before the finish annealing, the number average value Gs of the GOS values was calculated under the measurement conditions described above.

In addition, in order to examine the texture after the finish annealing, a part of the non-oriented electrical steel sheet was excised, and the excised test piece was reduced in thickness to ½. The average grain size ratio ($d_{411}/d_{111}$) was obtained by observing the measurement region by EBSD under the measurement conditions described above. Each result is shown in Table 3.

Further, the magnetic flux density B50 and the iron loss W10/400 were measured in order to examine the magnetic characteristics after the finish annealing. Also, as an index of stress sensitivity, an iron loss deterioration rate of iron loss W10/50 under compressive stress was obtained.

Regarding the magnetic flux density B50, 55 mm square samples were taken as measurement samples in two directions of 0° direction and 45° direction with respect to the rolling direction. For these two samples, the magnetic flux density B50 was measured by the above-described method. An average value of magnetic flux densities in the 45° direction and 135° direction with respect to the rolling direction was set to the magnetic flux density B50 in the 45° direction, and an average value thereof in the 0° direction, 45° direction, 90° direction, and 135° direction with respect to the rolling direction was taken as the entire circumferential average of the magnetic flux density B50. In a case in which the magnetic flux density B50 in the 45° direction was 1.70 T or more, the sample was determined to be a non-oriented electrical steel sheet with high magnetic flux density and passed. On the other hand, in a case in which the magnetic flux density B50 in the 45° direction was less than 1.70 T, the sample was determined not to be a non-oriented electrical steel sheet with high magnetic flux density and failed. In addition, in a case in which the magnetic flux density B50 in the 45° direction was 1.70 T or more and the entire circumferential average magnetic flux density B50 was 1.55 T or more, the sample was determined to be a non-oriented electrical steel sheet with higher magnetic flux density.

Regarding the iron loss W10/400, the iron loss W10/400 in the 45° direction was obtained by the above-described method using the above samples taken in the 45° direction with respect to the rolling direction. In a case in which the iron loss W10/400 in the 45° direction was 16.0 W/kg or less, the sample was determined to be a non-oriented electrical steel sheet with low iron loss and passed. On the other hand, in a case in which the iron loss W10/400 in the 45° direction was more than 16.0 W/kg, the sample was determined not to be a non-oriented electrical steel sheet with low iron loss and failed.

Further, regarding the iron loss deterioration rate $W_x$[%] of the iron loss W10/50 under compressive stress, when the iron loss W10/50 without stress was defined as W10/50(0) and the iron loss W10/50 under a compressive stress of 10 MPa was defined as W10/50(10), the iron loss deterioration rate $W_x$ was calculated by the following equation. In addition, using samples taken in the 45° direction with respect to the rolling direction and a single sheet magnetic measurement device, the entire circumferential average energy loss (W/kg) that occurred when an alternating magnetic field of 50 Hz was applied so that the maximum magnetic flux density was 1.0 T was measured to obtain the iron loss W10/50. In a case in which the iron loss deterioration rate $W_x$ was 40.0% or less, the sample was determined to be a non-oriented electrical steel sheet with little iron loss deterioration under compressive stress.

Table 3 shows the measurement results.

$$W_x = \{W10/50(10) - W10/50(0)\}/W10/50(0)$$

TABLE 1

| | Chemical composition (balance including Fe and impurities) | | | | | | | | | | | | | Transformation point | | |
|---|---|---|---|---|---|---|---|---|---|---|---|---|---|---|---|---|
| No. | C [mass %] | Si [mass %] | Sol. Al [mass %] | S [mass %] | N [mass %] | Mn [mass %] | Ni [mass %] | Cu [mass %] | Co [mass %] | Sn [mass %] | Sb [mass %] | P [mass %] | Mg, etc. [mass %] | Left side of expression [mass %] | Ar1 point [° C.] | Ac1 point [° C.] | Ac3 point [° C.] |
| 1 | 0.0018 | 2.5 | 0.005 | 0.0018 | 0.0011 | 3.0 | 0.0 | 0.0 | 0.0 | 0.00 | 0.00 | 0.020 | 0.000 | 3.41 | 779 | 932 | 982 |
| 2 | 0.0018 | 2.5 | 0.005 | 0.0018 | 0.0011 | 3.0 | 0.0 | 0.0 | 0.0 | 0.00 | 0.00 | 0.020 | 0.000 | 3.41 | 779 | 932 | 982 |
| 3 | 0.0018 | 2.5 | 0.300 | 0.0018 | 0.0011 | 2.0 | 0.0 | 0.0 | 0.0 | 0.00 | 0.00 | 0.020 | 0.000 | 0.82 | — | — | — |
| 4 | 0.0012 | 2.4 | 0.120 | 0.0015 | 0.0014 | 2.8 | 0.2 | 0.0 | 0.0 | 0.03 | 0.01 | 0.010 | 0.004 | 3.42 | 777 | 929 | 979 |
| 5 | 0.0018 | 2.5 | 0.005 | 0.0018 | 0.0011 | 3.0 | 0.0 | 0.0 | 0.0 | 0.00 | 0.00 | 0.020 | 0.000 | 3.41 | 779 | 932 | 982 |
| 6 | 0.0009 | 2.5 | 0.070 | 0.0008 | 0.0008 | 3.5 | 0.0 | 0.2 | 0.2 | 0.00 | 0.11 | 0.080 | 0.000 | 4.24 | 657 | 780 | 850 |
| 7 | 0.0009 | 2.5 | 0.800 | 0.0008 | 0.0008 | 4.0 | 0.0 | 0.0 | 0.0 | 0.00 | 0.11 | 0.100 | 0.000 | 3.50 | 759 | 908 | 957 |
| 8 | 0.0012 | 2.6 | 0.500 | 0.0015 | 0.0014 | 2.6 | 0.0 | 0.2 | 0.0 | 0.15 | 0.00 | 0.010 | 0.000 | 1.71 | 953 | 1059 | 1088 |
| 9 | 0.0012 | 1.0 | 0.005 | 0.0015 | 0.0014 | 2.5 | 0.0 | 0.0 | 0.0 | 0.15 | 0.00 | 0.010 | 0.000 | 3.95 | 673 | 820 | 848 |
| 10 | 0.0012 | 3.5 | 0.800 | 0.0015 | 0.0014 | 5.2 | 0.0 | 0.0 | 0.0 | 0.15 | 0.00 | 0.010 | 0.000 | 5.26 | 633 | 760 | 812 |
| 11 | 0.0022 | 3.4 | 0.020 | 0.0042 | 0.0023 | 3.7 | 0.0 | 0.0 | 0.0 | 0.00 | 0.00 | 0.006 | 0.005 | 3.91 | 699 | 897 | 975 |
| 12 | 0.0022 | 3.4 | 0.020 | 0.0042 | 0.0023 | 3.7 | 0.0 | 0.0 | 0.0 | 0.00 | 0.00 | 0.006 | 0.005 | 3.91 | 699 | 897 | 975 |
| 13 | 0.0018 | 1.8 | 0.200 | 0.0018 | 0.0011 | 3.0 | 0.0 | 0.0 | 0.0 | 0.00 | 0.00 | 0.020 | 0.000 | 3.72 | 732 | 901 | 966 |

TABLE 2

| | Hot rolling process | | | Cold rolling process Rolling reduction of Cold rolling RR1 [%] | Intermediate annealing process Intermediate annealing temperature T1 [° C.] | Skin pass rolling process Rolling reduction of skin pass rolling RR2 [%] | Finish annealing process | | |
|---|---|---|---|---|---|---|---|---|---|
| No. | Finish rolling temperature FT [° C.] | Coiling start [sec] | Temperature after 3 seconds [° C.] | | | | Finish annealing temperature T2 [° C.] | Finish annealing time Δt2 [hour] | Evaluation |
| 1 | 950 | 0.10 | 700 | 86 | 700 | 15 | 800 | 3 | Inventive example |
| 2 | 950 | 0.10 | 200 | 86 | 700 | 15 | 800 | 3 | Comparative example |

TABLE 2-continued

| | Hot rolling process | | | Cold rolling process Rolling reduction of | Intermediate annealing process | Skin pass rolling process Rolling reduction of | Finish annealing process | | |
|---|---|---|---|---|---|---|---|---|---|
| No. | Finish rolling temperature FT [° C.] | Colling start [sec] | Temperature after 3 seconds [° C.] | Cold rolling RR1 [%] | Intermediate annealing temperature T1 [° C.] | skin pass rolling RR2 [%] | Finish annealing temperature T2 [° C.] | Finish annealing time Δt2 [hour] | Evaluation |
| 3 | 950 | 0.10 | 700 | 86 | 700 | 15 | 800 | 3 | Comparative example |
| 4 | 950 | 0.50 | 400 | 86 | 700 | 15 | 800 | 3 | Inventive example |
| 5 | <u>650</u> | 0.10 | 550 | 86 | 700 | 15 | 800 | 3 | Comparative example |
| 6 | 850 | <u>0.08</u> | 600 | 86 | 700 | 15 | 750 | 3 | Comparative example |
| 7 | 850 | 0.12 | 600 | 86 | 700 | 15 | 800 | 3 | Inventive example |
| 8 | 1050 | 0.50 | 400 | 86 | 700 | 15 | 800 | 3 | Inventive example |
| 9 | 950 | 0.50 | 400 | 86 | 700 | 15 | 800 | 3 | Comparative example |
| 10 | 850 | 0.12 | 400 | 86 | 700 | 15 | 750 | 3 | Comparative example |
| 11 | 950 | 0.10 | 650 | 86 | 700 | <u>0</u> | 800 | 3 | Comparative example |
| 12 | 950 | 0.10 | 650 | 86 | 700 | <u>25</u> | 800 | 3 | Comparative example |
| 13 | 900 | 0.10 | 650 | 86 | 700 | 15 | 850 | 1 | Comparative example |

Underlines indicate that manufacturing conditions are unfavorable.

TABLE 3

| | | | | | | Magnetic characteristics | | | | |
|---|---|---|---|---|---|---|---|---|---|---|
| | After skin pass | Sheet | Microstructure | | | B50 (entire | B50 | W10/400 | Iron loss deterioration rate | |
| No. | Gs [-] | thickness [mm] | $d_{411}$ [μm] | $d_{111}$ [μm] | $d_{411}/d_{111}$ [-] | circumference) [T] | (45°) [T] | (45°) [W/kg] | $W_x$ [%] | Evaluation |
| 1 | 2.2 | 0.3 | 66 | 58 | 1.14 | 1.64 | 1.75 | 12.9 | 31.3 | Inventive example |
| 2 | 1.7 | 0.3 | 61 | 60 | <u>1.02</u> | 1.62 | 1.73 | 12.7 | <u>50.7</u> | Comparative example |
| 3 | 2.1 | 0.3 | 73 | 76 | <u>0.96</u> | 1.65 | <u>1.60</u> | 14.3 | <u>54.5</u> | Comparative example |
| 4 | 2.3 | 0.3 | 65 | 56 | 1.16 | 1.64 | 1.70 | 13.2 | 28.9 | Inventive example |
| 5 | 2.6 | 0.3 | 64 | 68 | <u>0.94</u> | 1.66 | <u>1.61</u> | 14.5 | <u>46.2</u> | Comparative example |
| 6 | 1.8 | 0.3 | 61 | 60 | <u>1.02</u> | 1.62 | 1.73 | 12.9 | <u>50.7</u> | Comparative example |
| 7 | 2.1 | 0.3 | 68 | 62 | 1.10 | 1.64 | 1.72 | 13.4 | 30.5 | Inventive example |
| 8 | 2.0 | 0.3 | 65 | 57 | 1.14 | 1.61 | 1.70 | 13.3 | 30.4 | Inventive example |
| 9 | 2.0 | 0.3 | 60 | 54 | 1.11 | 1.67 | 1.74 | <u>15.4</u> | 30.1 | Comparative example |
| 10 | 2.3 | 0.3 | 68 | 62 | 1.10 | 1.51 | <u>1.48</u> | 13.2 | 31.9 | Comparative example |
| 11 | 0.2 | 0.3 | 58 | 59 | <u>0.98</u> | 1.58 | <u>1.60</u> | 14.3 | <u>52.1</u> | Comparative example |
| 12 | 3.1 | 0.3 | 60 | 62 | <u>0.97</u> | 1.57 | <u>1.63</u> | 14.4 | 33.5 | Comparative example |
| 13 | 2.1 | 0.3 | 30 | 31 | <u>0.97</u> | 1.52 | <u>1.62</u> | 16.8 | <u>51.3</u> | Comparative example |

Underlines indicate that conditions are out of the scope of the present invention, or characteristics are unfavorable.

The underlines in Tables 1, 2, and 3 indicate that conditions are out of the scope of the present invention, manufacturing conditions are unfavorable, or characteristic values are unfavorable. No. 1, No. 4, No. 7, and No. 8, which are inventive examples of the present invention, had good values in all of the magnetic flux density B50, the iron loss W10/400, and the iron loss deterioration rate.

On the other hand, No. 2, which is a comparative example, had a small average grain size ratio ($d_{411}/d_{111}$) because it was quenched after the finish rolling, and the core loss deterioration rate under compressive stress was large.

In No. 3, which is a comparative example, the total amount of one or more elements selected from the group consisting of Mn, Ni, and Cu was insufficient, and the composition did not cause α-γ transformation, and thus the average grain size ratio ($d_{411}/d_{111}$) decreased, and the magnetic flux density B50 (45° direction), the iron loss W10/400, and the iron loss deterioration rate were inferior. Since No. 3 had a composition in which α-γ transformation did not occur, the Ar1 point, the Ac1 point, and the Ac3 point were not listed.

In No. 5, which is a comparative example, the finish rolling temperature FT was lower than the Ar1 point, and thus the average grain size ratio ($d_{411}/d_{111}$) was small, and the magnetic flux density B50 (45° direction), the iron loss W10/400, and the iron loss deterioration rate was inferior.

In No. 6, which is a comparative example, the average grain size ratio ($d_{411}/d_{111}$) decreased because the time from passing through the final pass of the finish rolling to the start of cooling was too short, and the iron loss deterioration rate under compressive stress was large.

No. 9, which is a comparative example, had a large iron loss W10/400 due to lack of Si.

In No. 10, which is a comparative example, the total amount of one or more elements selected from the group consisting of Mn, Ni, and Cu was excessive, and thus the magnetic flux density B50 was inferior in both the 45° direction and the entire circumference average. In addition, due to segregation, two-sheet cracks were partially generated during cold rolling.

In No. 11, which is a comparative example, the skin pass rolling was not performed, the average grain size ratio ($d_{411}/d_{111}$) decreased, and the magnetic flux density B50 (45° direction), the iron loss W10/400, and the iron loss deterioration rate were inferior.

In No. 12, which is a comparative example, the rolling reduction RR2 in the skin pass rolling was too large, and thus the average grain size ratio ($d_{411}/d_{111}$) decreased, and the magnetic flux density B50 (45° direction) and the iron loss W10/400 were inferior.

In addition, No. 13, which is a comparative example, did not meet the preferred manufacturing conditions, and thus desired metal structures could not be obtained, and desired characteristics could not be obtained.

INDUSTRIAL APPLICABILITY

According to the above aspects of the present invention, it is possible to provide the non-oriented electrical steel sheet that can curb the manufacturing load and has excellent magnetic characteristics including stress sensitivity and 45° direction characteristics.

The invention claimed is:
1. A non-oriented electrical steel sheet having a chemical composition of, by mass %,
C: 0.0100% or less,
Si: 1.5 to 4.0%,
sol. Al: 0.0001% to 1.000%,
S: 0.0100% or less,
N: 0.0100% or less,
one or more elements selected from the group consisting of Mn, Ni, and Cu: 2.5% to 5.0% in total,
Co: 0.0% to 1.0%,
Sn: 0.00% to 0.40%,
Sb: 0.00% to 0.40%,
P: 0.000% to 0.400%, and
one or more elements selected from the group consisting of Mg, Ca, Sr, Ba, Ce, La, Nd, Pr, Zn, and Cd: 0.000% to 0.010% in total,
with the balance consisting of Fe and impurities,
wherein, when a Mn content mass % is defined as [Mn], a Ni content mass % is defined as [Ni], a Cu content mass % is defined as [Cu], a Si content mass % is defined as [Si], a sol. Al content mass % is defined as [sol. Al], and a P content mass % is defined as [P], the following expression (1) is satisfied, and
wherein an average grain size of {411} crystal grains is defined as $d_{411}$ and an average grain size of {111} crystal grains is defined as $d_{111}$, $d_{411}/d_{111} \geq 1.10$,

$$(2 \times [Mn] + 2.5 \times [Ni] + [Cu]) - ([Si] + 2 \times [sol. Al] + 4 \times [P]) \geq 1.5\% \quad (1).$$

* * * * *